United States Patent [19]

Rutter et al.

[11] 4,244,195
[45] Jan. 13, 1981

[54] CONNECTION MEANS

[75] Inventors: Harold T. Rutter; Doyle W. Jaycox, both of St. Louis County, Mo.

[73] Assignee: Sunnen Products Company, St. Louis, Mo.

[21] Appl. No.: 3,388

[22] Filed: Jan. 15, 1979

[51] Int. Cl.³ ............................ F16D 3/18; F16D 3/54
[52] U.S. Cl. ....................................... 64/9 R; 64/1 C; 64/7; 64/8
[58] Field of Search ................ 64/9 R, 6, 1 C, 8, 9 A, 64/7

[56] References Cited

U.S. PATENT DOCUMENTS

| 2,354,184 | 7/1944 | Daniel | 64/7 |
|---|---|---|---|
| 2,386,630 | 10/1945 | O'Malley | 64/7 |
| 2,526,105 | 10/1950 | Adams | 64/7 |
| 2,895,314 | 7/1959 | Helm | 64/7 |
| 3,112,625 | 12/1963 | Leto | 64/9 A X |
| 4,080,079 | 3/1978 | Waara | 64/7 |
| 4,141,225 | 2/1979 | Varner | 64/7 |

Primary Examiner—Henry K. Artis
Attorney, Agent, or Firm—Haverstock, Garrett & Roberts

[57] ABSTRACT

A device for coupling members such as driving and driven members so as to permit limited relative angular movement therebetween including a first member having an end with a bore extending thereinto, the bore having a polygonal shaped bore portion formed by a plurality of flat surfaces, a coupling portion on the other member having a polygonal shaped head formed by a plurality of side surfaces which are rounded axially and an end surface, the respective rounded surfaces on the head being engageable with respective flat surfaces of the polygonal shaped bore portion, a cross-bore through the first member intersecting the bore therein, and a cross-bore through the coupling portion in position to register with the cross-bore in the first member, a pin member extending through the registered bores to hold the members together and yet permit some relative angular movement therebetween, a bearing member positioned in the bore in the first member in position to engage the end surface of the head on the coupling portion when the members are connected together, the diameter of the coupling portion being somewhat smaller than the diameter of the bore in the first member so that the space formed therebetween limits the amount of possible relative angular movement therebetween.

25 Claims, 6 Drawing Figures

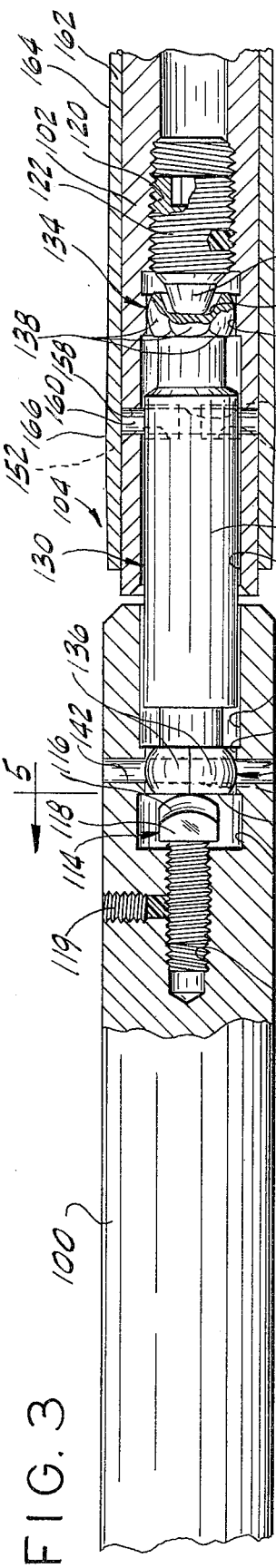
FIG. 3
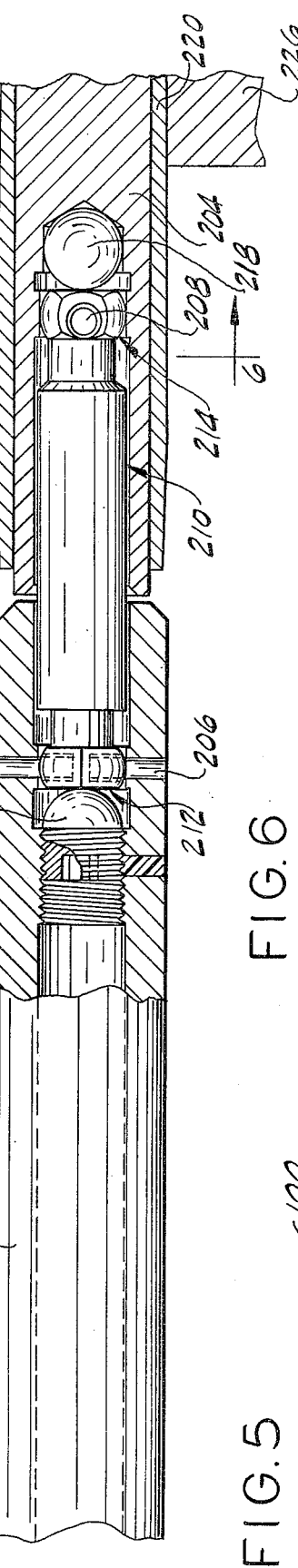
FIG. 4
FIG. 6
FIG. 5

CONNECTION MEANS

The need to provide a connection such as a universal connection between members such as between driving and driven members that are employed in machine tools and the like has long been recognized, and many different embodiments of connection or coupling devices have been devised and used in the past. All of the known devices have certain shortcomings and disadvantages, however, and because of this have enjoyed limited usefulness. One of the main problems with the known coupling devices is that they have provided too much free angular movement between the members and this has resulted in inaccuracy and undesirable motions of the members involved. For example, devices which provide too much relative movement are difficult to control, provide undesirable looseness between the coupled members, do not provide a strong connection between the coupled members, are subject to breakdown, are subject to undesirable side thrust and buckling forces, and it is difficult, if not impossible to make such devices sufficiently accurate and predictable in their movements to meet the requirements of a precision operation such as required for many operations including machine tool and honing machine operations. Too much looseness also creates undesirable maintenance problems. Many of these and other disadvantages of the known coupling devices have also limited their usefulness to vertical as distinguished from horizontal and other operating orientations. This is especially so unless some special added equipment is provided which complicates the device and substantially increases cost. Also, with the known devices the operating speed of the working members has been very substantially restricted in order to prevent undesirable whipping and/or eccentric movements that adversely effect the finished work. Too much relative movement and looseness also makes for too much flexibility and requires special care when starting a tool in a workpiece. Furthermore, excessive flexibility leads to buckling and to further inaccuracy.

The present constructions overcome these problems and improve workpiece alignment with respect to the tool. The subject devices also reduce or eliminate manual stroking which is especially hazardous as the speed of a tool and the tool flexibility increase. Furthermore, with the present constructions, unlike the prior devices, the coupling means are located very close to the cutting area of the tool, and it is preferred to have at least one of the pivot locations of the subject coupling located ahead of the sizing crown or high spot of the tool as it moves through the bore or other work surface so that the subject constructions actually operate by pulling the working member through the bore rather than pushing it through as has been done in the past. This substantially reduces the side thrust forces and the possibility of buckling and improves the geometry of the workpiece surface. This is especially important when the subject devices are used with honing devices where the honing members are constructed to have extremely hard abrasive surface characteristics which engage the work surface during movement of the tool therethrough, usually during movement of the tool in one direction, to hone the surface to a very precise final size and smoothness condition. Thereafter, the tool may be withdrawn as by dragging it back through the workpiece surface or bore while still rotating. The dragging back has little or no effect on the bore, however, and requires very little drag force because the bore by that time already has the desired size. This is true even though the tool may be rotating as it is being withdrawn. Typical of honing devices or mandrels with which the subject connection means have particular application are disclosed in copending Althen et al U.S. patent application Ser. No. 916,518, filed June 19, 1978 which is assigned to applicant's assignee.

Other prior art constructions which include flexible connection means are disclosed in U.S. Pat. Nos. 2,354,184; 2,386,630; 2,526,105, 2,895,314; 3,112,625 and 4,080,079. However, all of the devices disclosed in these prior art patents have shortcomings and disadvantages such as those mentioned which are not present when using the subject connection means, and the subject connection means are structurally and operationally distinguishable over all known prior art constructions including those disclosed in the named patents.

It is therefore a principal object of the present invention to teach the construction of novel means for connecting or coupling members such as driving and driven members.

Another object is to provide a flexible connection means capable of limited relative angular movement.

Another object is to teach the construction of a coupling device which is relatively safe and trouble free.

Another object is to teach the construction of a coupling device that does not place undesirable shearing or other loads on any of the components thereof.

Another object is to teach the construction and operation of a universal coupling which predeterminately restricts relative axial movement between driving and driven members.

Another object is to provide a relatively strong yet somewhat flexible connection between coupled members.

Another object is to minimize undesirable looseness between driving and driven members.

Another object is to reduce or eliminate the possibility of buckling and undesirable side forces when using a flexible coupling between driving and driven members.

Another object is to provide coupling means which provide limited universal angular movement between the coupled members.

Another object is to teach the construction of a relatively simple and easy to install coupling device which can be made in single or double jointed embodiments.

Another object is to teach the construction and operation of a universal coupling device which can be constructed to be used to pull rather than to push a working member through a workpiece thereby reducing side thrust forces and undesirable buckling.

Another object is to make it easier to start a tool moving into a workpiece and minimize the hazards normally associated therewith.

Another object is to make machine tool operations more automatic and less manual.

Another object is to provide a universal coupling device that can be operated safely even at relatively high speeds.

These and other objects and advantages of the present invention will become apparent after considering the following detailed specification in conjunction with the accompanying drawings, wherein:

FIG. 3 is a fragmentary cross-sectional view showing a double jointed embodiment of the present device;

FIG. 4 is a fragmentary cross-sectional view of another double jointed embodiment of the device;

FIG. 5 is a cross-sectional view taken on line 5—5 of FIG. 3; and

FIG. 6 is a cross-sectional view taken on line 6—6 of FIG. 4.

Figure 1:
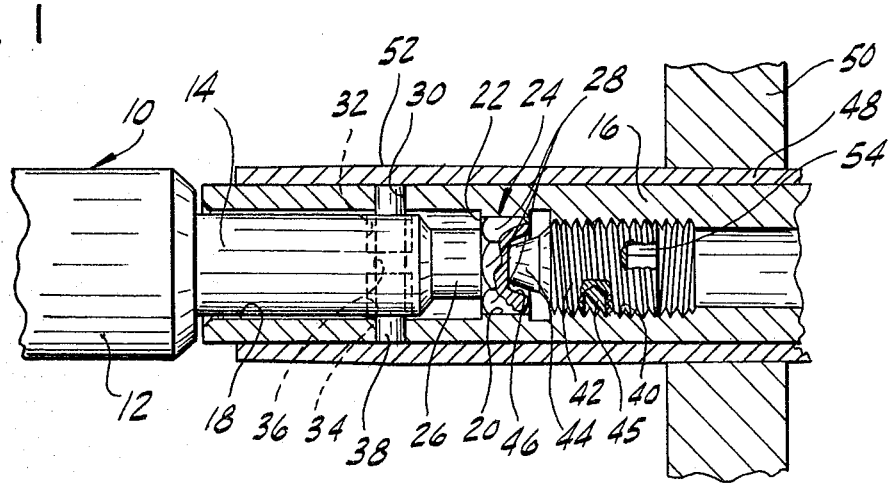
FIG. 1 is a fragmentary cross-sectional view showing a single jointed embodiment of the subject coupling means.

Referring to the drawings more particularly by reference numbers, number 10 identifies a driving member which is shown as having a cylindrical body portion 12 with a projecting smaller diameter end portion 14. The driving member 10 is coupled to a driven member 16 which is shown as being slightly tapered in shape, and has a cylindrical bore 18 extending thereinto from the larger diameter end thereof. The bore 18 is slightly larger in diameter than the projecting end portion 14 of the driving member 10, and the bore 18 has a polygonal shaped bore portion 20 which is shown as being hexagonal and formed by flat surfaces 22. The hexagonal shaped bore portion 20 is somewhat smaller in total cross-section than the bore 18 for reasons that will become apparent.

The projecting end portion 14 of the driving member 10 has a hexagonal shaped head 24 which is integrally connected to the end portion 14 by a reduced diameter neck 26. The head 24 is formed by a plurality of similar side surfaces 28 which are rounded in the axial direction and are of a size such that they mate with and engage the respective flat bore surfaces 22 of the hexagonal shaped bore portion 20 when the end portion 14 is positioned extending into the bore 18.

A cross-bore 30 extends through the driven member 16 at an intermediate location of the bore 18. The projecting end portion 14 of the driving member 10 also has a cross-bore or passage therethrough which passage is shown formed by two oppositely disposed counterholes 32 and 34 and a smaller diameter cross-bore 36 that extends therebetween. A pin 38 extends through the cross-bore 30 in the member 16 and through the passage formed by the bore portions 32, 34 and 36. The pin 38 has the same diameter as the bore 30 to be press fitted therein and a smaller diameter than the bores 32, 34 and 36 so that some limited angular movement is possible between the pin 38 and the bore 32, 34 and 36. This also provides some free movement of the pin 38 relative to the driving member 10 which is desirable because the driving force between the members 10 and 16 is transmitted through the hexagonal head 24 to the hexagonal bore portion 20, and no driving or pushing force is borne by the pin 38 except a pulling force when the tool is being withdrawn from the work after having passed therethrough. At this time the load on the pin 38 is minimal because the work has reached the required size. The pin 38 therefore carries no load as the driven member 16 advances through the work which is highly desirable. However, by having some free play between the pin relative to the driving member 10, the driving and driven members 10 and 16 are allowed limited free angular movement but not enough to exceed the clearance of the counterbores 32 and 34. This clearance should not be exceeded circumferentially either, and is usually less than about a degree or so and this is advantageous for several reasons which will become apparent. In a typical situation a half a degree of possible relative angular movement is very adequate.

Figure 2:
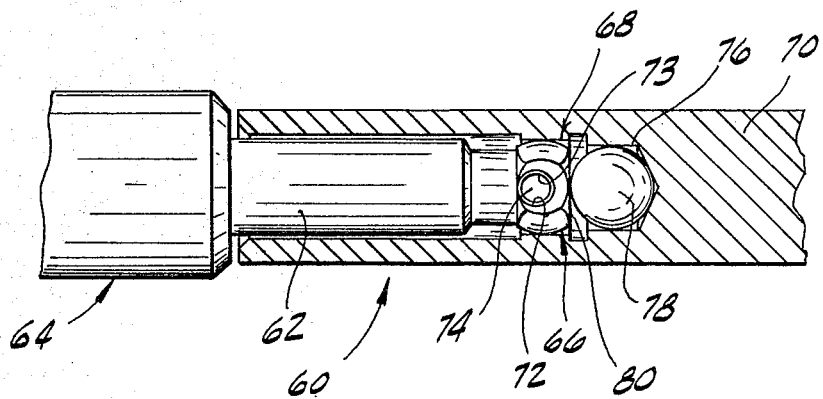
FIG. 2 is a fragmentary cross-sectional view showing another single jointed embodiment of the subject coupling means.

A single jointed construction such as shown in FIGS. 1 and 2 is particularly adaptable for use in a situation where a tool such as a drill or honing tool is to be held by an operator while in use. In these cases the operator's hand acts as a second joint to prevent undesirable twisting or binding and to enable the tool to adjust laterally to some extent.

With a double jointed construction such as disclosed in FIGS. 3 and 4, however, some self adjustment to compensate for misalignment and otherwise is possible, and these constructions are more readily adaptable for use on automatic or semiautomatic machines where the operator does not need to hold the tool but may be required in some cases to start the tool in the work. This is to be contrasted with non bendable or rigid connections or connections that are too loose and sloppy. This will be explained more in detail later, and is possible because with a double jointed construction the driving and driven members are able to be maintained in parallel or near parallel relation even if not in exact axial alignment. The amount of angular movement that is possible is limited by the diameter of the portion 14 as compared to the diameter of the bore 18 and also by the length of the portion 14 that extends into the bore 18. The degree of fit between the surfaces 28 of the head 24 and the bore surfaces 22 also to some extent affects the amount of possible relative movement. Naturally the better the fit the less the looseness and the better the driving connection between the members.

The driven member 16 is shown having a threaded bore portion 40 which receives an adjustable plug 42 which has a portion of a spherical surface on its end 44. A plastic member 45 is positioned in the side of the plug 42 to engage the threaded bore 40 to hold an adjustment. The end 44 abuts a flat bottom cavity or socket 46 formed in the free end of the head portion 24 of the member 14. During a machine tool driving operation when the member 16, which has a work engaging portion 48 mounted thereon, is moving through a bore in a workpiece 50 from left to right as shown, the socket 47 bears against the spherical end 44 of the member 42 to transmit the axial load from the driving to the driven member. This means that there will be no axial or other load on the pin 38 to cause a binding action.

In a honing application where the tubular member 48 is a honing mandrel having a tapered inner surface which mates with the tapered outer surface of the driven member 16, it has been found desirable to have the outer abrasive work engaging surface of the member 48 reach a high spot or crown 52. It is preferred that the crown 52 be to the left of the head 24 in the construction as shown so that the thrust connection of the flat surface 46 and spherical surface 44 will be located to pull rather than to push the mandrel 48 through the workpiece 50 at least during a part of the honing operation. It should be recognized, however, that some pushing will take place as the mandrel 48 moves through the work and the pulling occurs mainly when the crown portion 52, which is the largest diameter part of the mandrel 48, moves through the work. This is a very desirable condition. This has distinct operational advantage including eliminating any tendency of the coupling to buckle and minimizing or completely eliminating any possible side thrust forces which could produce error. After the crown 52 of the mandrel 48 has passed completely through the workpiece 50 the mandrel can be relatively easily withdrawn from the workpiece while still rotating, simply by pulling it back through. During withdrawal, little or no stock removal takes place and relatively little force is required for the withdrawal. This is advantageous because during withdrawal most of the withdrawal force will be borne by the pin 38. This has not been found to be objectionable or damaging to the workpiece or to the pin.

In the construction shown in FIG. 1 the cavity 46 in the head 24 has a flat surface as stated, and the end 44 of the adjustable thrust member 42 is spherical where it is in engagement therewith. This is done to provide the least amount of binding action while transmitting the driving thrust from the driving member to the driven member. The position of the threaded thrust member 42 is adjustable in the threaded bore 40 using a wrench or a screwdriver (not shown). A wrench socket 54 (or screwdriver slot) is shown formed in the end of the member 42 for this purpose.

FIG. 2 shows another embodiment 60 of a single jointed connection means. The construction 60 operates similarly to that of FIG. 1 but differs structurally therefrom in several respects. Most importantly, the construction 60 has a portion 62 of driving member 64 which has a polygonal shaped head portion 66 that is positioned in a polygonal shaped bore portion 68 in the driven member 70. The construction of the bore portion 68 is similar to that of the bore portion 20 shown in FIG. 1. However, in the FIG. 2 construction, the head 66 has a cross-bore 72 therethrough, and the cross-bore 72 registers with a cross-bore 73 through the driven member 70. A pin 74 extends through the registered bores 72 and 73, and during operation when the device is being used to drive a working member through a workpiece as from left to right, no load will be present on the pin 74 because of the oversize of the cross-bore 72. As in the construction of FIG. 1, the pin 74 serves several functions including keeping the parts together and enabling the tool to be withdrawn from the workpiece. Also in the construction of FIG. 2, the pin 74 is at or near the axis of the head 66 so that the head can rotate relative to the pin, and in this construction it may be possible to use a somewhat smaller cross-bore for the cross-bore 72. Also in the construction of FIG. 2, as in the FIG. 1 construction, the driving force for rotating the driven member 70 is through the engagement between the head 66 and the socket 68, and through the end thrust means which will be described.

The construction of FIG. 2 has a socket 76 in the driven member 70 which receives a thrust member shown as ball bearing 78. The socket 76 may be staked to prevent the ball bearing 78 from falling out. The ball bearing 78 engages flat end surface 80 of the head 66 to provide a non-adjustable thrust surface against which the head 66 bears and can pivot with no binding action. Except for the structural differences noted, the construction of FIG. 2 is similar and operates similarly to the construction of FIG. 1, both being single jointed constructions. As explained the single jointed constructions are especially useful for hand held tools where the hand and wrist joints of the operator act as a second joint to keep the tool in proper alignment without binding.

The constructions shown in FIGS. 3 and 4 are double jointed constructions incorporating some of the same structural and operational features as the single jointed constructions of FIGS. 1 and 2, and are more adaptable for use on automatic or semiautomatic tools. In all cases these constructions provide limited angular movement between members such as between driving and driven members. However, in the case of the double jointed devices the relative angular movement between the members is shared by two joints rather than one. This has advantages in certain applications including application where a working member engages a cylindrical surface. This is because the double jointed constructions enable the driven member which carries the tool portion to maintain alignment with the bore in the workpiece being machined when this bore is not in true alignment with the spindle of the machine and the driving member. This enables a tool such as a rotating honing mandrel to be operated entirely by a machine without any operator handling or control of the tool except possibly to start the tool in the work. The advantages of this from accuracy and labor-saving standpoints are readily apparent.

Number 100 identifies a driving member which is shown in axial alignment with a driven member 102 which is coupled thereto by double jointed coupling means 104. Several embodiments of the double jointed constructions are disclosed in the drawings and will be described in detail. Referring to FIG. 3, the driving member 100 has a counter bore 106 formed extending in from the free end thereof. The bore 106 is a cylindrical bore and communicates with another bore portion 108 which is hexagonal in shape being formed by six flat surfaces. The hexagonal bore portion 108 is somewhat smaller in total cross section than the bore portion 106 for reasons which will become apparent. Extending further into the member 100 is another bore portion 110 which communicates with a threaded bore portion 112. The threaded bore portion 112 receives a threaded adjustment member 114 that has a portion of a spherical surface as its end portion 116. The spherical end portion 116 is formed on a squared end portion 118 which provides means for adjusting its axial position using a suitable socket wrench (not shown). A set screw 119 is provided to lock the member 114 in a desired position of adjustment.

The driven member 102 is tubular in shape having a tapered outer surface to receive a honing member or the like, and it has a threaded bore portion 120 that receives a threaded adjustment member 122. The member 122 has a spherical end 124. The driven member 102 also has a bore portion 126 which extends inwardly from the free end thereof, and the bore portion 126 communicates with an hexagonal shaped bore portion 128.

Of particular importance to the double jointed construction is the provision of a double headed link or coupling member 130 which is shown having two similar opposed hexagonal shaped head ends 132 and 134. The heads 132 and 134 are each provided with six axially rounded surfaces 136 and 138 respectively and are constructed to cooperatively engage the respective flat surfaces of the hexagonal bore portions 108 and 128 when installed.

The head 132 has an oversized cross-bore 140 which extends therethrough between a pair of the opposite rounded surfaces 136 thereof, and when the head 132 is positioned in the bore portion 108 as shown in FIG. 3, the bore 140 registers with a cross-bore 142 through the driving member 100. When so positioned, and with head end surface 144 of the head 132 abutting the spherical surface 116 of the member 114, a pin 146 is inserted through the aligned bores 140 and 142 to hold the members 100 and 130 together. This connection enables limited universal angular movement between the members being limited by the amount of clearance provided between body portion 148 of the coupling member 130 and the bore 106, and the clearance between the head 132 and hexagonal bore portion 108. The oversize of the bore 140 through the head 132 assures that the pin 146 will not carry any of the load when a tool is moving forward through a workpiece during the working part of the cycle. It should be noted that in all positions of relative movement between the members 100 and 130, the head end surface 144 will be engaged with the spherical end portion 116 of the member 114 to prevent looseness therebetween and to provide a positive driving connection in the forward axial direction. Again note that none of the axial driving force is applied to or borne by the pin 146.

In the construction of FIG. 3, the head 134 is positioned in the hexagonal shaped bore portion 128 and is engaged therewith in a manner similar to the head 132. The free end of the head 134 has a flat bottom socket 150 formed therein which cooperates with the partial spherical shaped end portion 124 of the member 122 to take the axial load. Also the body 148 of the coupling member 130 has a pair of opposed counter bores 152 and 154 and a connecting cross-bore 156 formed therethrough, and these register with cross-bore 158 through the driven member 102 when the members are assembled as shown. The cross-bores 152, 154, 156 are larger in diameter than the cross-bore 158, and pin 160 extends through these registered cross-bores. This is done for reasons that have already been stated. The pins 146 and 160 preferably, but not necessarily, should be located at right angles to each other to provide the most desirable operating condition.

The driven member 102 is shown tapered axially to receive a tubular honing mandrel or sleeve 162 which has its inner surface tapered. The mandrel 162 is shown extending to cover the free ends of the pin 160 to prevent the pin from coming loose, although the pin 160 is preferably press fitted into the cross-bore 158 in the member 102.

The honing sleeve 162 has an abrasive outer surface 164 formed of some hard material such as diamond particles in a binder or particles of a substance such as cubic boron nitride or tunsten carbide. The reason for using such hard materials is to that the mandrel need only pass through a work surface to be honed once in order to hone it to some precise desired size and to desired surface characteristics. This is done by applying rotating force to and through the driving member 100 and the coupling member 130 to the driven member 102 while axially moving the mandrel (or the workpiece) to advance the mandrel through the workpiece. The mandrel 162 has a substantially cylindrical outer surface which reaches a slight peak or crown at 166 which is at some location that represents the desired final workpiece size. The crown 166 is preferably located to the left of the head 134 in the construction as shown in FIG. 3. This is done so that the subject device will actually operate to pull, rather than push, the mandrel through the work surface especially as the largest diameter portion of the mandrel moves therethrough. This is done to prevent undesirable side thrust and buckling forces which otherwise could cause some inaccuracies and possible damage.

It is also important to recognize that with the double jointed constructions of FIGS. 3 and 4, the driven member 102 need not be in exact axial alignment or even in exact parallelism with the driving member 100 during operation. This is due to the ability of the device to adjust and self-align itself to the work which would not be possible with a device that has no such connection. In a single jointed construction where the operator supports and guides the tool the second joint is provided by the joints in the operator's wrist and arm as stated. In the double jointed construction, on the other hand, once the tool is started in the work it is able to maintain itself in alignment in the work even if some misalignment exists between the driving and the driven members.

FIG. 5 is an enlarged sectional view showing in greater detail the construction of the adjustable stop member 114 that is located in the driving member 100.

FIG. 4 shows the details of another double jointed universal coupling 200 which is used for the same purposes as the device of FIG. 3, namely to couple two substantially aligned members 202 and 204. The coupling 200 differs from the coupling of FIG. 3 in several respects including principally in the fact that the cross pins 206 and 208 extend through oversized cross-bores in the respective head portions 212 and 214 rather than through an enlarged cross-bore at an intermediate location in the body portion of the coupling member. Also in the construction of FIG. 4, the pins 206 and 208 are shown at right angles to each other which is preferred but not required. Except for these differences the constructions of FIGS. 3 and 4 are similar and operate similarly. The means for taking the end thrust or axial load in the construction 200 may be similar to those means already described above or may be as shown in FIG. 4 where the driving member 202 is tubular and has a thrust member 216 which can be adjusted by suitable wrench means, not shown, that extend through the member 202, from the opposite end thereof. The axial thrust means in the driven member 204 include a ball member 218 positioned in a suitable socket therefor. The socket can be staked, if desired, to prevent the ball from coming out.

In FIG. 4 a portion of a tubular honing member 220 is shown mounted on the driven member 204. The member 220 is shown exaggerated to have a very slightly tapered outer abrasive work engaging surface 222 that reaches its maximum diameter at crown 224. The crown 224 is preferably to the left of the head 214 for reasons already stated. The improved results achieved by using double jointed coupling means as disclosed herein has been demonstrated under operating conditions. It should be recognized, however, that the subject couplings can be varied dimensionally, and in some cases it may not be objectionable to push a working member through a workpiece but this is not generally as desirable.

FIG. 6 is an enlarged cross sectional view showing the relationship between the typical hexagonal shaped head portion such as the head portion 214 and the hexagonal bore portion in which it is positioned. For the best operating condition these members should have relatively little clearance between them. Also, because of the relatively limited possible angular movement between members coupled using the subject double jointed construction, it is relatively easy and safe to start a tool in a workpiece even when the tool is rotating at a relatively high speed. This in large part is because a tool so equipped is able to establish within limits its own most advantageous operating position. These, and other advantages of the present construction are important to the ease of machine operation, and to the accuracy of the results obtainable.

Thus there has been shown and described several different embodiments of a single and of a double jointed coupling construction which fulfill all of the objects and advantages sought therefor. It will be apparent to those skilled in the art, however, that many changes, modifications, variations, combinations, including combinations of cross pin location, adaptations and other uses and applications of the subject invention are possible. All such changes, modifications, variations, combinations, adaptations and other uses and applications thereof which do not depart from the spirit and scope of the invention are deemed to be covered by the invention which is limited only by the claims which follow.

What is claimed is:

1. Means for coupling substantially aligned members comprising a first elongated member adapted to be rotated, a second elongated member and means for coupling the members, said first member having a bore formed extending into said member from one end thereof, a projection formed on one end of the second member extending into said bore, said bore having a polygonal shaped bore portion spaced from the end of said first member, said projection having a polygonal shaped head portion for cooperation with the polygonal shaped bore portion, said head portion having a free end surface formed thereon, means in said bore in position to abut the free end surface of said polygonal shaped head portion to limit penetration of the projecting portion into said bore and to provide force transmitting contact therebetween in the axial direction, and other means to hold said projection in said bore including registered cross-bores through said first and second members at a location intermediate the ends of said bore, the cross-bore through said first member being smaller in diameter than the cross-bore through the projection, and a pin extending through the registered cross-bores to prevent the members from coming apart.

2. The means defined in claim 1 wherein one of said members has an axially tapered outer surface, and a work engaging member having an axially tapered inner surface for cooperating with the tapered outer surface of said one member.

3. The means defined in claim 2 wherein the work engaging member is a tubular honing member having an outer abrasive surface which reaches a maximum diameter intermediate the ends thereof, the location of the maximum diameter of the honing member being axially located on said one member on the side of the head that is toward the other member.

4. The means defined in claim 1 wherein the polygonal shaped surfaces on the head portion of the projection are arcuately curved in the axial direction.

5. The means defined in claim 1 wherein the polygonal shaped bore portion and the polygonal shaped head portion are hexagonal in shape.

6. The means defined in claim 2 wherein the work engaging member extends over the registered cross-bores.

7. The means defined in claim 1 wherein the means in the bore in position to abut the free end of the head portion includes a member axially adjustable in said bore.

8. The means defined in claim 1 wherein the means in the bore in position to abut the free end of the head portion has a portion of a spherical surface in abutment therewith.

9. Means for coupling substantially aligned elongated driving and driven members each having opposed ends comprising elongated driving and driven members each having opposed ends arranged so that one end of the driving member is adjacent one end of the driven member, a bore extending into one of said members from said one end thereof and a projection on the adjacent end of the other member extending into said bore, said bore having a polygonal shaped bore portion spaced from the one end of said member and said projection on the other member having a polygonal shaped portion cooperatively engageable with the polygonal shaped bore portion to form a driving connection therebetween, means in the bore engageable by the projection to limit penetration of the projection therein and to transmit axial forces between the driving and driven members, means connecting the driving and driven members together including registered cross-bores through the members including through the projection on the said other member, and a pin positioned extending through the cross-bores, the registered cross-bore through the projection being larger in cross section than the cross section of the pin.

10. The means defined in claim 9 wherein the bore is in the driven member and the projection is on the driving member.

11. The means defined in claim 9 wherein the bore is in the driving member and the projection is on the driven member.

12. The means defined in claim 9 wherein the cross-bore through the projection is through the polygonal shaped portion thereof.

13. The means defined in claim 9 wherein the cross-bore through the projection is spaced from the polygonal shaped portion.

14. Means to couple aligned rotatable driving and driven members comprising an elongated driving member having an axis and a free end with an axial bore extending thereinto, a driven member having an axis and a free end with an axial bore extending thereinto, each of said axial bores having a polygonal shaped bore portion spaced from the free end of the respective member and means forming a fixed stop therein, a cross-bore through each of said driving and driven members intersecting the axial bore therein, an elongated coupling member having a similar polygonal shaped portion adjacent each opposite end thereof, each of said polygonal shaped portions having a surface forming a free end of said elongated coupling member, a pair of axial spaced cross-bores through said elongated coupling member in position to register respectively with the cross-bores through the driving and driven members when the coupling member is positioned extending into the axial bores in said driving and driven members in positions therein with the polygonal sh. ped head portions engaging the respective polygonal  ped bore portions and with the respective free end su. faces on said coupling member engaging the respective fixed bore stops, and a pin extending respectively through each set of registered cross-bores to hold the members together, the respective cross-bores through the elongated coupling member being larger in cross-section than the cross-section of the pin.

15. The means defined in claim 14 wherein the driven member has an outer surface that is axially tapered, and a work engaging member having an axially tapered inner surface for cooperating with the tapered outer surface of the driven member.

16. The means defined in claim 15 wherein the work engaging member is a honing member having an outer abrasive surface which reaches a maximum diameter intermediate the ends thereof, the location of the maximum diameter of the honing member being axially located when the honing member is mounted on the driven member on the side of the polygonal shaped portion of said coupling member that is located in the bore in the driven member that is toward the driving member.

17. The means defined in claim 14 wherein the elongated coupling member has a cylindrical body portion that extends intermediate between the spaced polygonal shaped portions, the diameter of said body portion being less than the diameter of the axially extending bores in the driving and driven members.

18. The means defined in claim 14 wherein the elongated coupling member extends further into one of said driving and driven members than into the other.

19. The means defined in claim 14 wherein the axially spaced cross-bores through the elongated coupling member are angularly related to each other.

20. The means defined in claim 14 wherein the polygonal shaped surfaces of the polygonal shaped portions of the elongated coupling member are arcuately curved in the axial direction.

21. The means defined in claim 14 wherein the polygonal shaped bore portions and polygonal shaped portions of the coupling member are hexagonal.

22. The means defined in claim 14 wherein the driving and driven members are limited by the relative size of the diameters of the coupling member and the bore portions to approximately 1° of relative angular movement.

23. The means defined in claim 15 wherein the work engaging member extends over the cross-bore in the driven member to prevent the pin positioned therein from coming out.

24. The means defined in claim 14 wherein the fixed stop in at least one of the driving and driven members includes a threaded member that is axially adjustable therein.

25. The means defined in claim 14 wherein the fixed stop in at least one of said driving and driven members has a portion of a spherical surface adjacent to the respective end surface of the coupling member.

* * * * *